(12) United States Patent
Coleman

(10) Patent No.: US 6,772,873 B1
(45) Date of Patent: Aug. 10, 2004

(54) DRIVE SYSTEM FOR ROLLER CONVEYOR

(75) Inventor: Charles R. Coleman, Oregon, OH (US)

(73) Assignee: Dillin Engineered Systems Corporation, Perrysburg, OH (US)

( * ) Notice: Subject to any disclaimer, the term of this patent is extended or adjusted under 35 U.S.C. 154(b) by 0 days.

(21) Appl. No.: 10/277,169

(22) Filed: Oct. 21, 2002

Related U.S. Application Data

(60) Provisional application No. 60/339,045, filed on Oct. 22, 2001.

(51) Int. Cl.$^7$ ............................................... B65G 13/02
(52) U.S. Cl. ...................... 198/780; 198/790; 198/791
(58) Field of Search ................................ 198/780, 790, 198/791

(56) References Cited

U.S. PATENT DOCUMENTS

| | | | |
|---|---|---|---|
| 2,883,172 A | * 4/1959 | Mitchell | .................... 432/246 |
| 3,587,828 A | 6/1971 | Ferko | |
| 3,724,643 A | * 4/1973 | Kohl | .......................... 198/787 |
| 4,311,242 A | 1/1982 | Hnatko | |
| 4,361,224 A | 11/1982 | Bowman | |
| 4,406,360 A | * 9/1983 | Smith et al. | ........... 198/781.06 |
| 5,056,653 A | 10/1991 | Lancaster | |
| 5,147,024 A | 9/1992 | Yamada | |
| 5,148,909 A | 9/1992 | Becker et al. | |
| 5,333,722 A | 8/1994 | Ouellette | |
| 5,348,140 A | 9/1994 | Clos | |
| 5,377,817 A | * 1/1995 | Kohl | ...................... 198/781.03 |
| 5,380,104 A | * 1/1995 | Garnett | ....................... 384/546 |
| 5,558,234 A | 9/1996 | Mobley | |

* cited by examiner

*Primary Examiner*—Richard Ridley
(74) *Attorney, Agent, or Firm*—MacMillan, Sobanski & Todd, LLC

(57) ABSTRACT

A roller conveyor includes a frame having a plurality of roller rotatably supported thereon by respective pairs of roller bearings. A drive system is provided for selectively rotatably driving each of the plurality of rollers. The drive system includes a gear secured to each of the plurality of rollers and a plurality of belts extending between adjacent ones of the gears. As a result, rotation of one of the gears causes rotation of the adjacent one of the gears. The belts are toothed timing belts that are arranged in a two-column, staggered manner along the roller conveyor. The roller conveyor is well suited for relatively high speed operation.

12 Claims, 6 Drawing Sheets

DRIVE SYSTEM FOR ROLLER CONVEYOR

CROSS REFERENCE TO RELATED APPLICATION

This application claims the benefit of U.S. Provisional Application No. 60/339,045, filed Oct. 22, 2001, the disclosure of which is incorporated herein by reference.

BACKGROUND OF THE INVENTION

This invention relates in general to conveyors for transporting packages from one location to another. In particular, this invention relates to an improved drive system for rotatably driving a plurality of rollers on such a conveyor.

Conveyors are well known devices that are commonly used to support and transport packages from one location to another, such as in production line situations. For example, a conveyor may be used to transport packages of a product from an upstream filling station, wherein the packages are filled with the product and sealed, to a downstream packaging station, wherein the sealed packages are packaged into larger shipping containers. Many conveyor structures are known in the art for accomplishing these basic support and transportation functions.

A typical conveyor includes a frame that rotatably supports a plurality of elongated cylindrical rollers in a planar, parallel array on a frame. Some or all of such rollers may be connected to and selectively rotatably driven by a drive system that is usually mounted on the frame of the conveyor. When the drive system is actuated, the rollers are rotatably driven so as to cause packages supported thereon to be moved along a path of movement that is generally perpendicular to the rotational axes of the rollers. Although known drive systems for conveyors have been effective, it would be desirable to provide an improved drive system for a roller conveyor that is well suited for relatively high speed operation.

SUMMARY OF THE INVENTION

A roller conveyor includes a frame having a plurality of rollers rotatably supported thereon by respective pairs of roller bearings. A drive system is provided for selectively rotatably driving each of the plurality of rollers. The drive system includes a gear secured to each of the plurality of rollers and a plurality of belts extending between adjacent ones of the gears. As a result, rotation of one of the gears causes rotation of the adjacent one of the gears. The belts are toothed timing belts that are arranged in a two-column, staggered manner along the roller conveyor. The roller conveyor is well suited for relatively high speed operation.

Various objects and advantages of this invention will become apparent to those skilled in the art from the following detailed description of the preferred embodiments, when read in light of the accompanying drawings.

DETAILED DESCRIPTION OF THE PREFERRED EMBODIMENT

Figure 2:
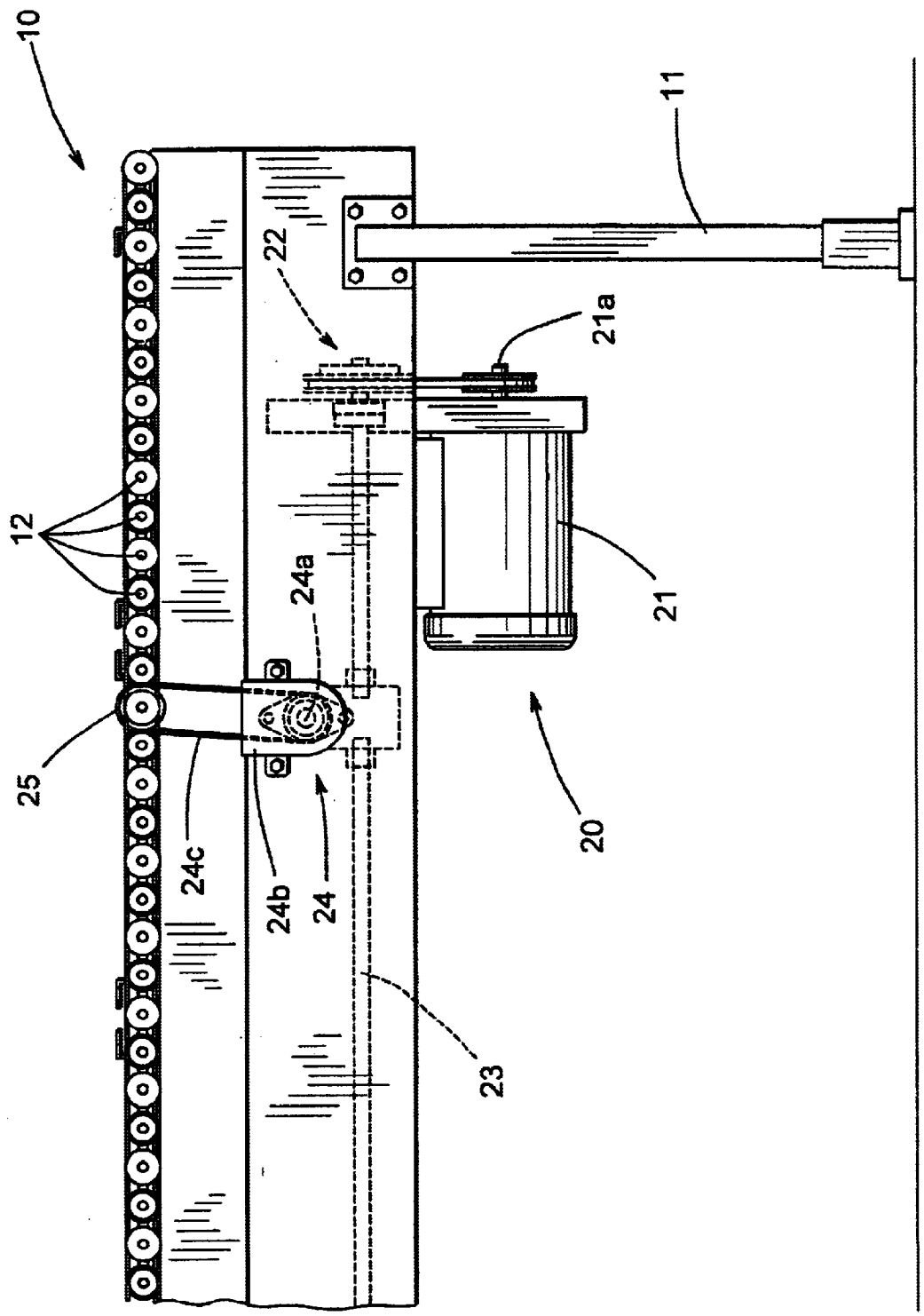
FIG. 2 is a side elevational view of a portion of the roller conveyor and the drive system illustrated in FIG. 1.
Figure 3:
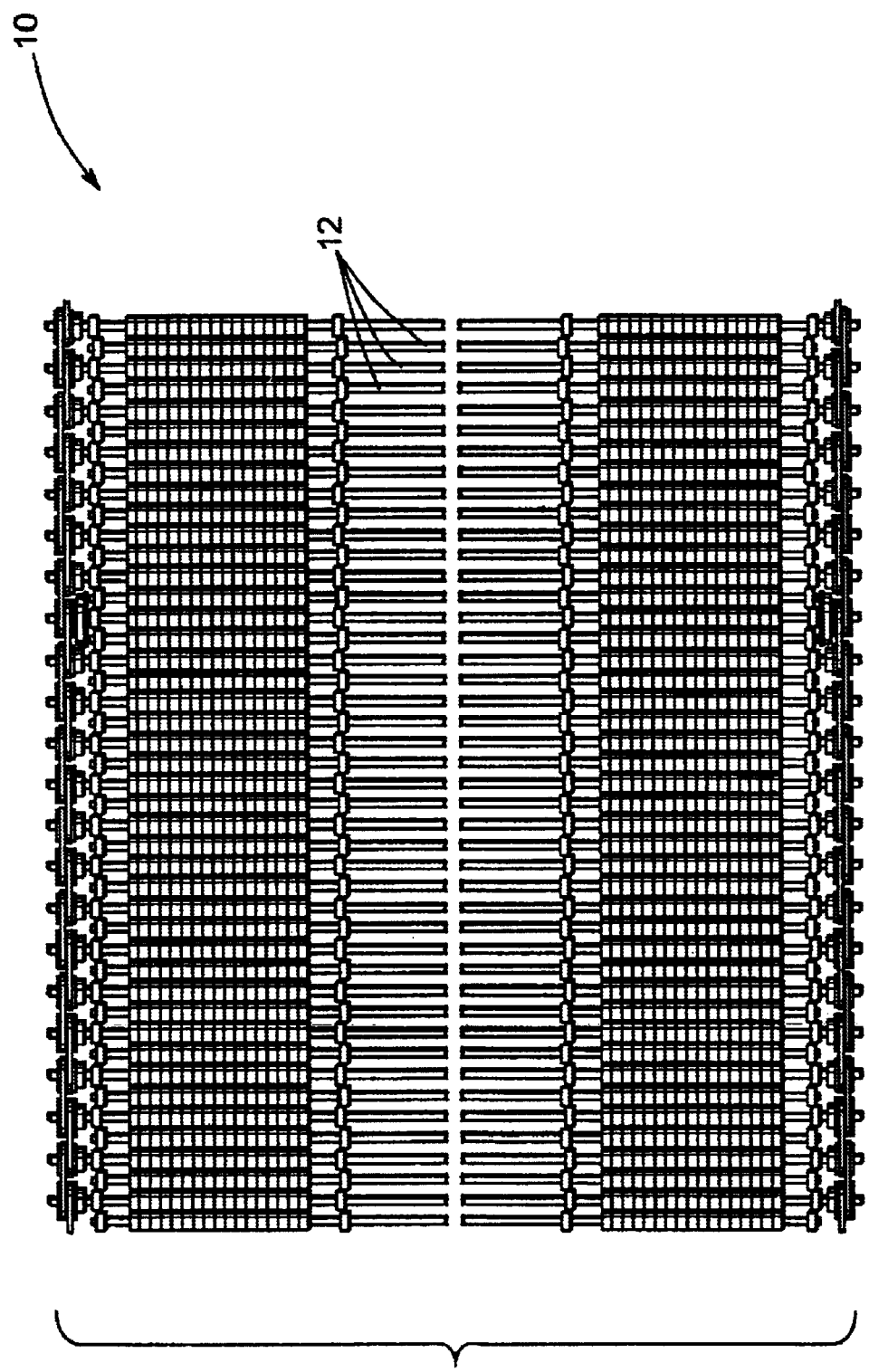
FIG. 3 is top plan view of a portion of the roller conveyor and drive system illustrated in FIGS. 1 and 2.

Referring now to the drawings, there is illustrated a first embodiment of a roller conveyor, indicated generally at 10, in accordance with this invention. The roller conveyor 10 includes a frame 11 (shown in dotted lines) that is conventional in the art and may be composed of a number of rigid structural members that are connected together, such as by bolts or welds. A plurality of rollers 12 are rotatably supported on the frame 11 in a manner that is described in detail below. As best shown in FIGS. 2 and 3, the rollers 12 are supported on the frame 11 in a planar, parallel array. The rollers 12 define a path of movement for the conveyor 10 that is generally perpendicular to the rotational axes of such rollers 12.

A drive system, indicated generally at 20, is mounted on the frame 11 and, in the manner described further below, is provided to selectively rotatably drive some or all of the rollers 12 so as to cause packages (not shown) supported on the rollers 12 to be moved along the path of movement that, as mentioned above, is generally perpendicular to the rotational axes thereof. The drive system 20 includes a motor 21 that is supported on the frame 11. The motor 21 has an output shaft 21a that is connected in a conventional manner, such as by a drive belt and pulley mechanism indicated generally at 22, to rotatably drive a drive shaft 23. The drive shaft 23 is rotatably supported on the frame 11 at predetermined intervals and extends generally along the path of movement of the packages, but beneath the plurality of rollers 21. Thus, when the motor 21 is actuated, the drive shaft 23 is caused to rotate.

Figure 1:
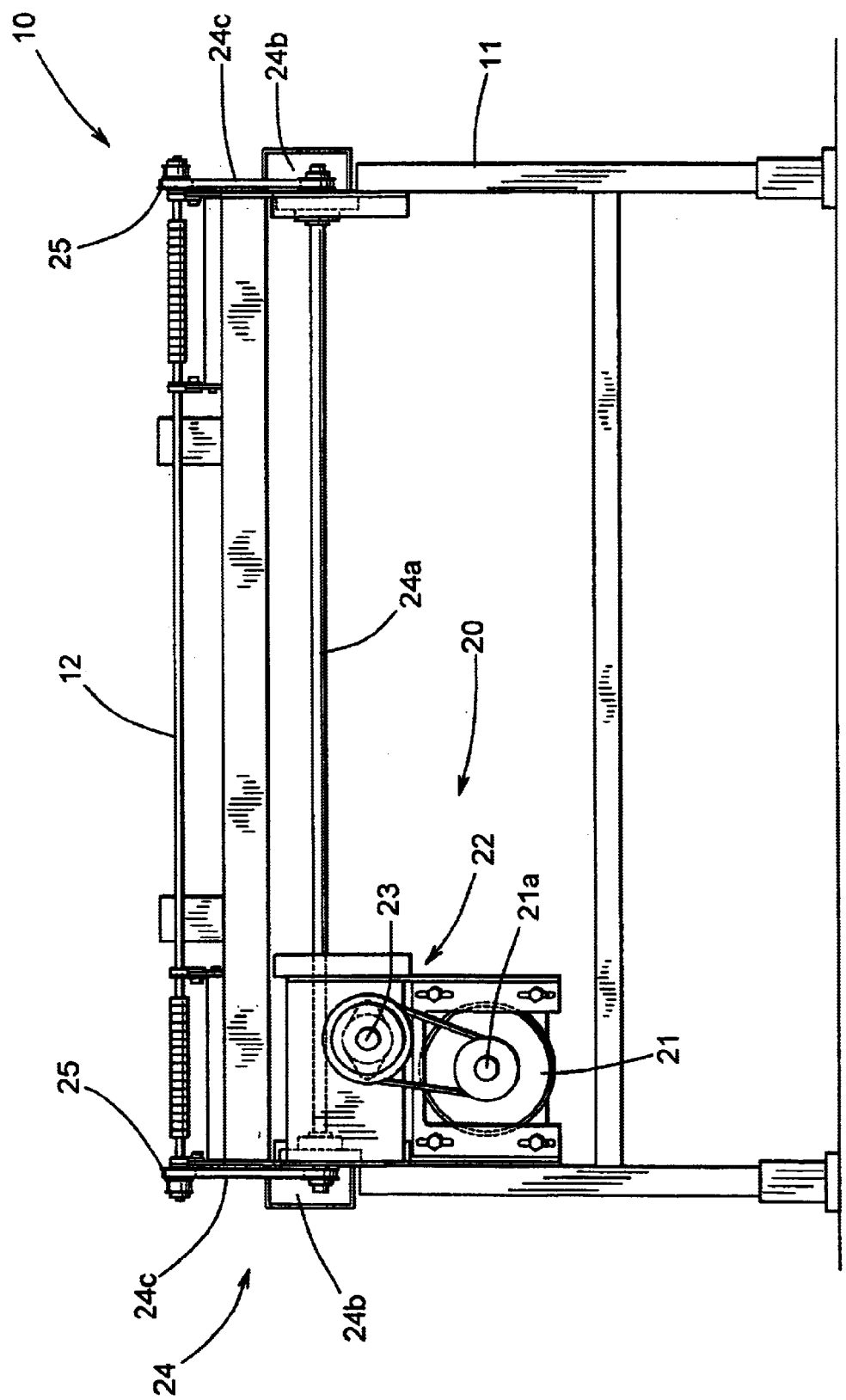
FIG. 1 is an end elevational view of a first embodiment of a roller conveyor including a drive system in accordance with this invention.

The drive train system also includes a plurality of drive transfer assemblies, one of which is illustrated generally at 24 in FIGS. 1 and 2. The drive transfer assemblies 24 are provided on the frame 11 of the roller conveyor 10. Each of the drive transfer assemblies 24 is adapted to transmit rotational energy from the drive shaft 23 to a selected one of the plurality of rollers 12. To accomplish this, each of the drive transfer assemblies 24 includes an intermediate shaft 24a that extends transversely across the conveyor 10, parallel to and beneath the plurality of rollers 12, as best shown in FIG. 1. The intermediate shaft 24a is connected in a conventional manner to the drive shaft 23 such that when the drive shaft 23 is rotatably driven, the intermediate shaft 24a is also rotatably driven.

Each of the drive transfer assemblies 20 also includes a pair of drive transfer units 24b that are provided on either side of the conveyor 10. The ends of the intermediate shaft 24a are respectively supported in the drive transfer units 24b. A belt 24c or other mechanism extends between each of the drive transfer units 24b and the end of its associated roller 12, as best shown FIGS. 1 and 2. The belts 24c may, if desired, be embodied as toothed timing belts that cooperate respectively with toothed main gears 25 that are secured to the opposite ends of the associated roller 12. Thus, when the drive shaft 23 is rotated by the motor 21 as described above, the rollers 12 associated with each of the drive transfer assemblies 24 are also rotated.

Figure 4:
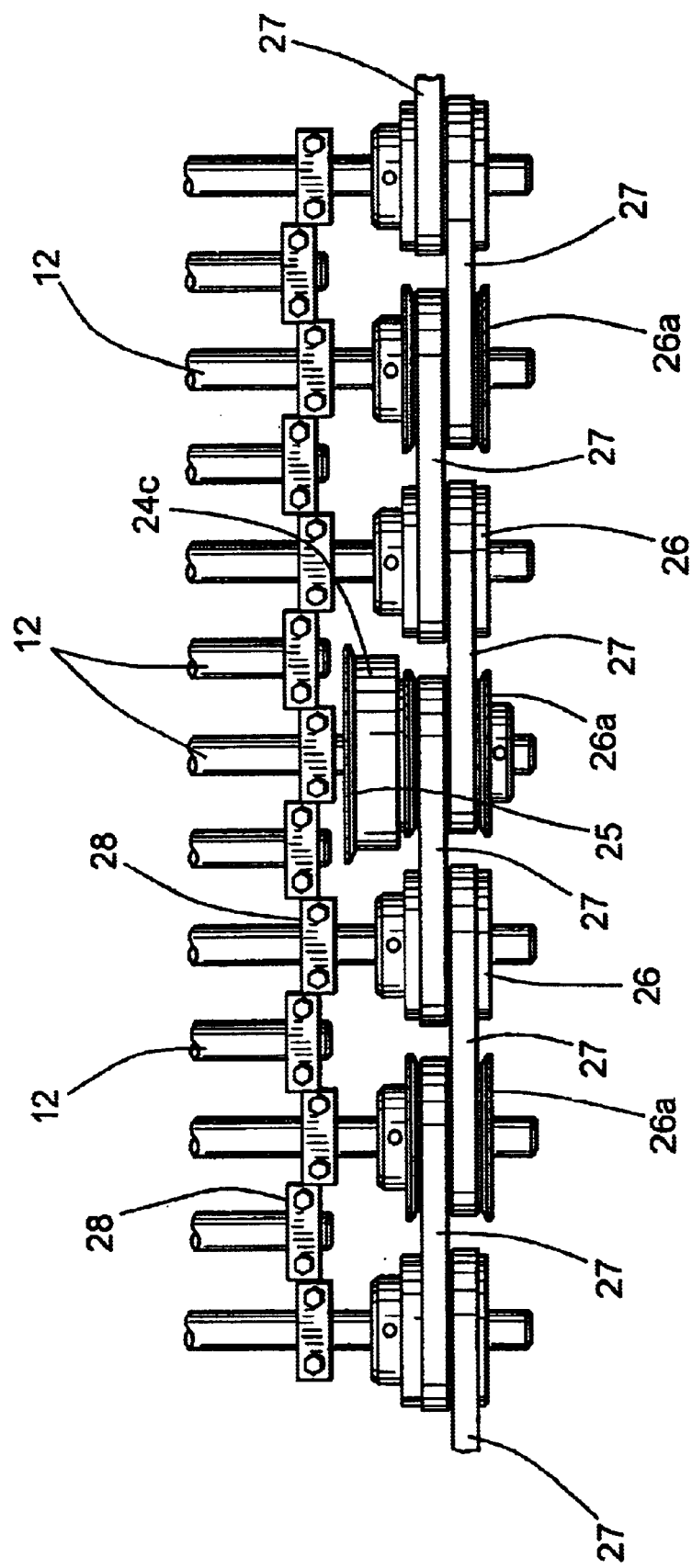
FIG. 4 is an enlarged top plan view of a portion of the roller conveyor and drive system illustrated in FIG. 3.

FIG. 4 best illustrates a first aspect of the invention, wherein the rollers 12 that are directly rotatably driven by the drive transfer assemblies 24 as described above are, in turn, connected to rotatably drive the other rollers 12 supported on the frame 11 of the conveyor 10. As shown therein, each end of each of the rollers 12 has a toothed auxiliary gear or pulley 26 secured thereto. A plurality of belts 27 extend between adjacent ones of the auxiliary gears 26 such that rotation of one of such auxiliary gears 26 (and, therefore, its associated roller 12) causes rotation of the other auxiliary gear 26 connected thereto (and, therefore, its associated roller 12). The belts 27 are preferably toothed timing belts that are arranged in a two-column, staggered manner along the conveyor 10. Thus, when the selected ones of the roller 12 are rotated by the drive transfer assemblies 24, all of the other rollers 12 are rotatably driven as well. Alternate ones of the auxiliary gears 26 may, if desired be formed having circumferential flanges 26a on the opposed sides thereof to positively retain the belts 27 thereon.

Preferably, a limited number of rollers 12 are connected to be rotatably driven by each of the rollers 12 that are directly rotatably driven by the drive transfer assemblies 24 as described above. For example, it may be desirable to connect a total of twenty-eight rollers 12 to be rotatably driven by each of the rollers 12 that are directly rotatably driven by the drive transfer assemblies 24, fourteen of such rollers on each side of the roller 12 that is directly rotatably driven by one of the drive transfer assemblies 24. Thus, each of the drive transfer assemblies 24 is effective to rotate a total of twenty-nine of the rollers 12.

FIG. 4 also best illustrates a second aspect of the invention, relating to the manner in which each of the rollers 12 is rotatably supported on the frame 11. As shown therein, the opposite ends of each of the rollers 12 are each rotatably supported in a roller bearing 28 that, in turn, is supported on the frame 11 of the conveyor 10. The roller bearings 28 are conventional in structure and operation. Typically, each of the roller bearings 28 includes an inner race that is frictionally engaged with the associated roller 12, an outer race that is supported on the frame 11 of the conveyor 10, and a plurality of balls or other rolling devices that support the inner race within the outer race for rotation relative thereto, with low frictional resistance to such relative rotation.

The combination of the toothed belts 27 with the roller bearings 28 has been found to facilitate operation of the conveyor at relatively fast speeds. In other words, the motor 21 can be operated at relatively high speeds to cause packages supported on the plurality of rollers 12 to be moved along the conveyor 10 at relatively high speeds.

Figure 5:
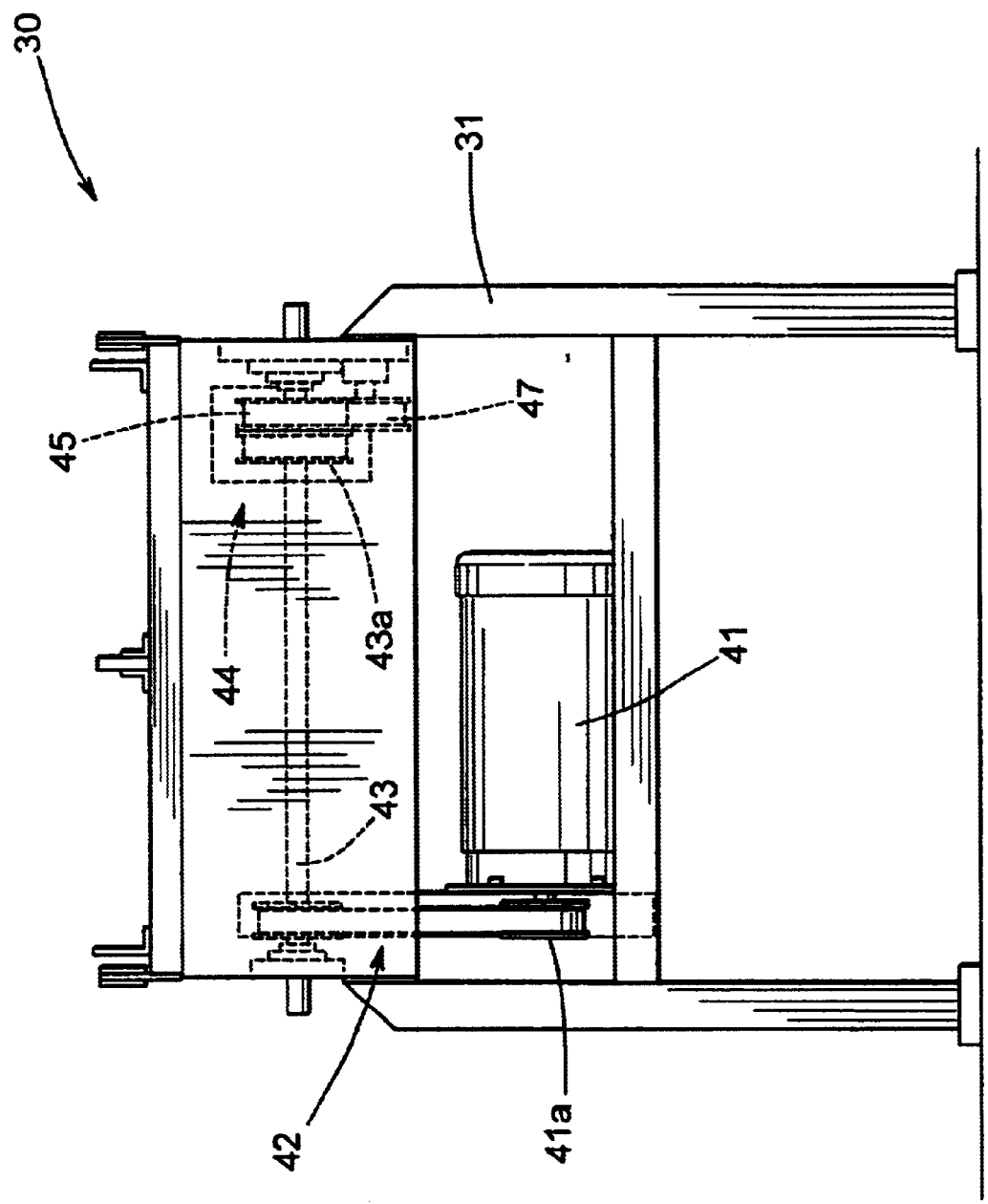
FIG. 5 is an end elevational view of a second embodiment of a roller conveyor including a drive system in accordance with this invention.
Figure 6:
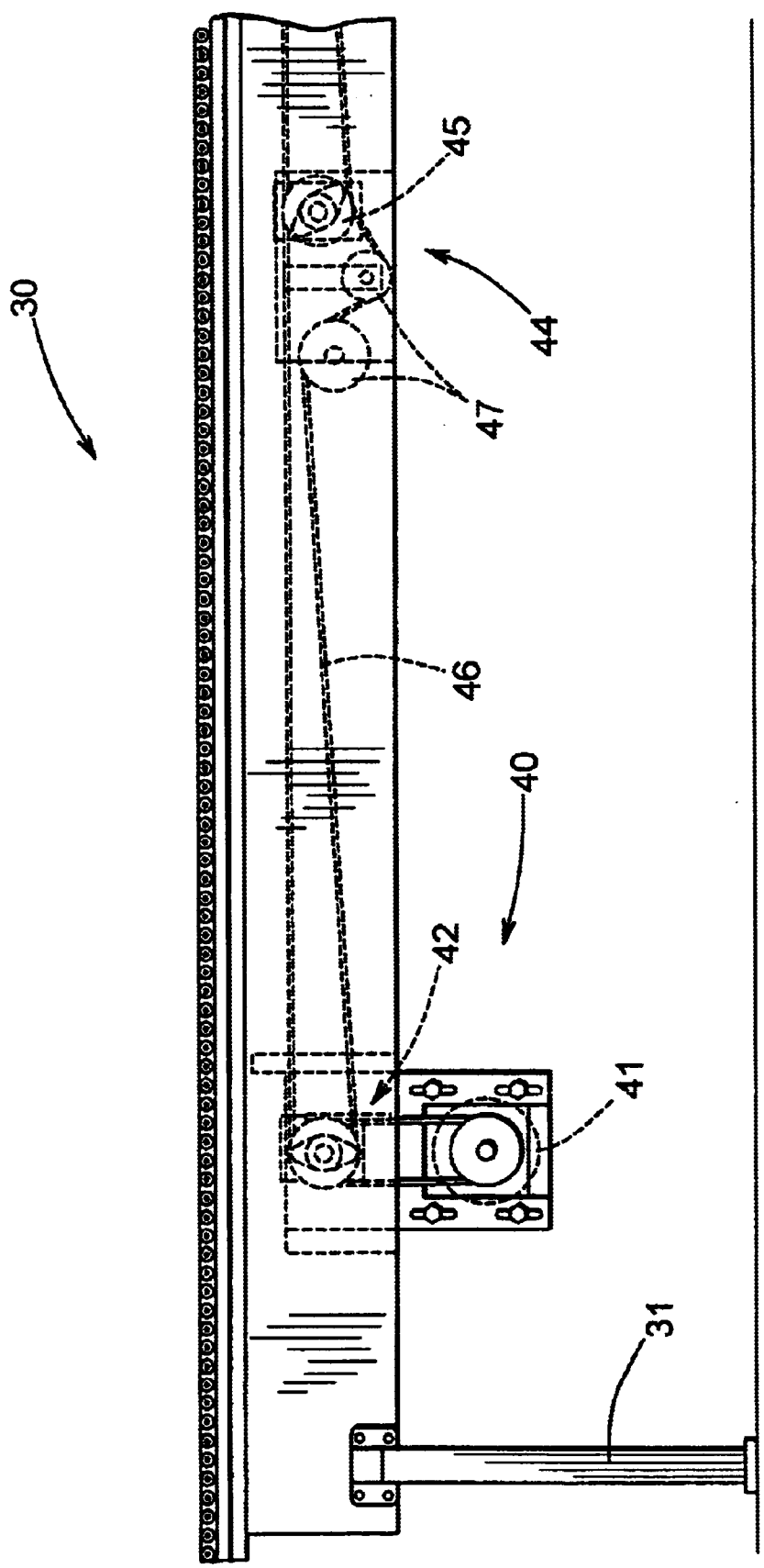
FIG. 6 is a side elevational view of a portion of the roller conveyor and the drive system illustrated in FIG. 5.

Referring now to FIGS. 5 and 6, there is illustrated a second embodiment of a roller conveyor, indicated generally at 30, in accordance with this invention. The roller conveyor 30 includes a frame 31 that is conventional in the art and may be composed of a number of rigid structural members that are connected together, such as by bolts or welds. A plurality of rollers (not shown) are rotatably supported on the frame 31 in the manner described above. A drive system, indicated generally at 40, is mounted on the frame 31 and, in the manner described further below, is provided to selectively rotatably drive some or all of the rollers so as to cause packages (not shown) supported on the rollers to be moved along the path of movement that, as mentioned above, is generally perpendicular to the rotational axes thereof. The drive system 40 includes a motor 41 that is supported on the frame 11. The motor 41 has an output shaft 41a that is connected in a conventional manner, such as by a drive belt and pulley mechanism indicated generally at 42, to rotatably drive a drive shaft 43. The drive shaft 43 is rotatably supported on the frame 41 and extends generally transversely to the path of movement of the packages, but beneath the plurality of rollers. Thus, when the motor 41 is actuated, the drive shaft 43 is caused to rotate. A toothed drive gear 43a is connected to the end of the drive shaft 43 for rotation therewith. The purpose for the toothed drive gear 43a will be explained below.

The drive system 40 also includes a plurality of drive transfer mechanisms, indicated generally at 44 in FIGS. 5 and 6, that are provided on the frame 41 of the roller conveyor 40. Each of the drive transfer mechanisms 44 is adapted to transmit rotational energy from the drive shaft 43 to a selected one of the plurality of rollers. To accomplish this, each of the drive transfer mechanisms 44 includes a main toothed gear 45 that is connected to the associated one of the plurality of rollers, such as by a belt (not shown) or other mechanism that extends between each of the drive transfer mechanisms 44 and the end of its associated roller. Thus, when the toothed main gears 45 are rotated, the associated rollers of the roller conveyor 30 are also rotated. The toothed main gears 45 of adjacent ones of the drive transfer mechanisms 44 are connected together for concurrent rotation by a toothed belt 46 extending therebetween. The toothed belt 46 may, if desired, extend about one or more idler gears or pulleys 47. Thus, when any one of the toothed main gears 45 is rotated, all of the toothed main gears 45 of all of the drive transfer units 44 are also rotated. The rollers that are directly rotatably driven by the drive transfer mechanisms 44 as described above are, in turn, connected to rotatably drive the other rollers supported on the frame 41 of the conveyor 40 in the same manner as described above.

As mentioned above, when the motor 41 is actuated, the drive shaft 43 and the toothed drive gear 43a are caused to rotate. The toothed drive gear 43a is connected to one of the toothed main gears 45 of one of the drive transfer mechanisms 44. Thus, when the motor 41 is actuated, the drive shaft 43, the toothed drive gear 43a, and all of the toothed main gears 45 of all of the drive transfer mechanisms 44 are caused to rotate. Consequently, all of the rollers of the roller conveyor are caused to rotate so as to cause packages supported thereon to be moved along a path of movement that is generally perpendicular to the rotational axes of the rollers.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A roller conveyor comprising:

a frame;

a plurality of rollers rotatably supported on said frame by respective pairs of roller bearings, said frame directly supporting said respective pairs of roller bearings, said respective pairs of roller bearings directly supporting said plurality of rollers; and a drive system for selectively rotatably driving said plurality of rollers, said drive system including a gear secured to each of said plurality of rollers and a plurality of belts extending between adjacent ones of said gears such that rotation of one of said rollers causes rotation of said adjacent one of said rollers, said belts being toothed timing belts that are arranged in a two-column, staggered manner along said roller conveyor.

2. The roller conveyor defined in claim 1 wherein said frame includes a plurality of rigid structural members that are connected together.

3. The roller conveyor defined in claim 1 wherein each of said roller bearings includes an inner race that is frictionally engaged with an associated one of said plurality of rollers, an outer race that is supported on said frame 11, and a plurality of balls that support said inner race within said outer race for rotation relative thereto.

4. The roller conveyor defined in claim 1 wherein said drive system includes a source of rotational power that is connected to rotatably drive said one of said rollers.

5. The roller conveyor defined in claim 4 wherein said drive system includes a drive shaft that is rotatably driven by said source of rotational power and a drive transfer unit that is connected between said drive shaft and said one of said rollers.

6. The roller conveyor defined in claim 5 wherein said drive transfer unit includes a belt that is connected between said drive shaft and a main gear that is connected to said one of said rollers.

7. The roller conveyor defined in claim 4 wherein said drive system includes a drive shaft that is rotatably driven by said source of rotational power and a pair of drive transfer units that are connected between said drive shaft and said one of said rollers.

8. The roller conveyor defined in claim 7 wherein each of said drive transfer unit includes a belt that is connected between said drive shaft and a main gear that is connected to said one of said rollers.

9. The roller conveyor defined in claim 4 wherein said drive system includes a drive shaft that is rotatably drive by said source of rotation power and a drive transfer mechanism that is connected between said drive shaft and said one of said rollers.

10. The roller conveyor defined in claim 9 wherein said drive transfer mechanism includes a drive gear that is connected to said drive shaft, a main gear that is connected to said roller, and a belt that is connected between said drive gear and said main gear.

11. The roller conveyor defined in claim 4 wherein said drive system includes a drive shaft that is rotatably drive by said source of rotation power and a plurality of drive transfer mechanisms that are respectively connected between said drive shaft and a plurality of said rollers.

12. The roller conveyor defined in claim 10 wherein each of said drive transfer mechanisms includes a drive gear that is connected to said drive shaft, a main gear that is connected to one of said plurality of said rollers, and a belt that is connected between said drive gear and said main gear.

* * * * *